US012536983B1

(12) United States Patent
Gimbelman et al.

(10) Patent No.: US 12,536,983 B1
(45) Date of Patent: Jan. 27, 2026

(54) HANDS-FREE MOTORIZED HARMONICA POSITIONER

(71) Applicants: Steven Gimbelman, Edison, NJ (US); Sam Baldwin, Andover (GB)

(72) Inventors: Steven Gimbelman, Edison, NJ (US); Sam Baldwin, Andover (GB)

(73) Assignee: Steven Gimbelman, Edison, NJ (US)

( * ) Notice: Subject to any disclaimer, the term of this patent is extended or adjusted under 35 U.S.C. 154(b) by 258 days.

(21) Appl. No.: 18/510,765

(22) Filed: Nov. 16, 2023

Related U.S. Application Data

(60) Provisional application No. 63/426,085, filed on Nov. 17, 2022.

(51) Int. Cl.
G10G 5/00 (2006.01)
G05D 3/12 (2006.01)
G10D 7/14 (2020.01)
H02K 7/116 (2006.01)

(52) U.S. Cl.
CPC ............ *G10G 5/005* (2013.01); *G05D 3/121* (2013.01); *G10D 7/14* (2020.02); *H02K 7/116* (2013.01)

(58) Field of Classification Search
CPC .......... G10G 5/005; G10G 5/00; G05D 3/121; G10D 7/14; G10D 7/00; H02K 7/116
See application file for complete search history.

(56) References Cited

U.S. PATENT DOCUMENTS

| 303,743 A | 8/1884 | Murphy |
|---|---|---|
| 753,713 A | 3/1904 | Knode |
| 1,535,206 A | 4/1925 | Davidson |
| 1,793,823 A | 2/1931 | Overton |

(Continued)

FOREIGN PATENT DOCUMENTS

| DE | 7922300 | 12/1979 |
|---|---|---|
| DE | 202011050570 U1 | 10/2011 |

(Continued)

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Kimberly R Lockett
(74) *Attorney, Agent, or Firm* — Thomas A. O'Rourke; James Bongiorno; O'Rourke IP Law, PLLC

(57) ABSTRACT

A harmonica positioning device includes a yoke, support member, gear arrangement, and motor. The yoke encircles the musician's neck. A first portion of the harmonica support member releasably couples to a harmonica, and a second portion secures to a shaft that co-rotates with one of the gears, which are housed within the yoke. A wireless foot pedal controls the motor to drive the gears to rotate to thereby rotate the harmonica between a first position and a second position. The motor and gear arrangement is particularly configured to provide friction and a stall torque that holds the harmonica support member in an upright position even while the user is playing the harmonic, without using a dedicating locking mechanism. An encoder detects rotation speed and rotation angle of the motor to control the motor to limit movement of the harmonica support member to at least the first and second positions.

12 Claims, 15 Drawing Sheets

(56) References Cited

U.S. PATENT DOCUMENTS

| | | |
|---|---|---|
| 1,884,150 A | 10/1932 | Numberg |
| 1,912,654 A | 6/1933 | Peterson |
| 1,951,928 A | 3/1934 | Elkington |
| 1,954,169 A | 4/1934 | Fluter |
| 3,172,328 A | 3/1965 | Haile |
| 3,332,310 A | 7/1967 | Pochobraosky |
| 3,818,792 A | 6/1974 | Gerbetz |
| 4,212,219 A | 7/1980 | Hubbard |
| 4,287,803 A | 9/1981 | Zema |
| 4,397,213 A | 8/1983 | Hubbard |
| 4,414,879 A | 11/1983 | Ruiz |
| 4,713,999 A | 12/1987 | Burt |
| 5,479,841 A | 1/1996 | Garrett |
| 5,608,177 A | 3/1997 | Zadworny |
| 5,619,001 A | 4/1997 | Pasin |
| 5,635,656 A | 6/1997 | Bowden |
| 5,929,352 A | 7/1999 | Gutc |
| 7,091,408 B2 | 8/2006 | Thibodeau |
| D633,554 S | 3/2011 | Nguyen |
| 8,362,346 B1 | 1/2013 | Prozinski |
| 8,729,373 B2 | 5/2014 | Quealy |
| 8,940,987 B2 | 1/2015 | Kaynor |
| 8,993,864 B1 | 3/2015 | Cramer |
| 9,029,673 B2 | 5/2015 | Kaynor |
| 9,430,995 B1 | 8/2016 | Paresi |
| 2015/0090097 A1* | 4/2015 | Kaynor .................. G10G 5/005 84/379 |

FOREIGN PATENT DOCUMENTS

| | | |
|---|---|---|
| GB | 2268825 A | 1/1994 |
| KR | 101355775 B1 | 1/2014 |

OTHER PUBLICATIONS

"Three General Types of Fit," available at www.mmto.org/~dclark/Reports/Encoder%20Upgrade/fittolerences%20%5BRead-Only%5D.pdf, Jul. 8, 2019.

"Engineering Fit," available at: https://en.wikipedia.org/wiki/Engineering_fit, Jul. 8, 2019.

* cited by examiner

FIG. 21
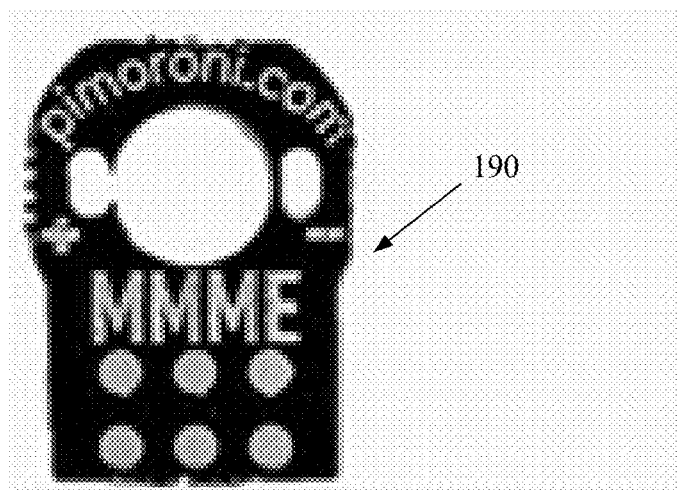
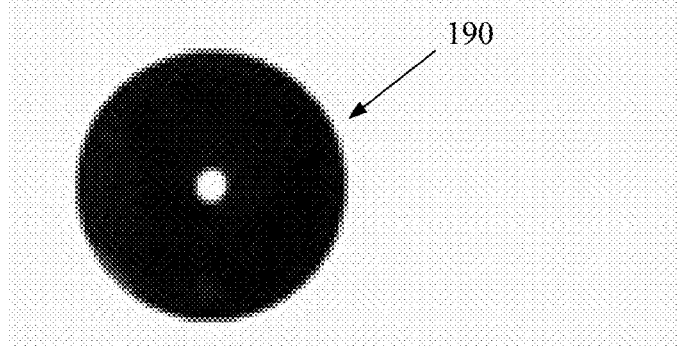
FIG. 22

HANDS-FREE MOTORIZED HARMONICA POSITIONER

CROSS-REFERENCES

This application claims priority on U.S. Provisional Patent Application Ser. No. 63/426,085, filed on Nov. 17, 2022, the disclosures of which are incorporated herein by reference.

FIELD OF THE INVENTION

The subject technology relates generally to apparatus that is configured to support a harmonica, and more particularly relates to a motorized harmonica positioning device that may be actuated using a switch, such as wireless foot pedal switch, to move a harmonica support frame from a distal position to a proximal position where the attached harmonica may be played by a musician, without ever needing to use his/her hands to change the harmonica positioning.

BACKGROUND OF THE INVENTION

Many musicians are multi-talented, including some who can both sing and play the harmonica. Those musicians often exhibit both talents-singing and playing the harmonica-alternately while performing the same song. Some musicians can even play a second instrument such as a guitar while playing the harmonica.

Therefore, some harmonica holder devices had been developed in the past to permit hands-free playing of a harmonica, such as the U.S. Pat. No. 753,713 to Knode, which includes wire of strong and rigid character being bent to overhang and be supported by the shoulders of the musician, with another wire having inwardly turned ends to support the harmonica in proximity to the user's mouth. However, when the musician switches from playing the harmonica to singing while using the device of the '713 patent, the harmonica blocks and otherwise obstructs projection of the sound emanating from the musician's mouth, which detracts from his/her vocal performance.

The "Harmonica Holder" of U.S. Pat. No. 1,793,823 to Overton uses a substantially U-shaped yoke that is shaped to encircle a portion of the neck of the musician, and has free ends that are upturned and which support a harmonica. Although this device is not clamped to the musician, it would require the user to utilize his/her hands to move/rotate the device and harmonic out of the way (i.e., rotating the harmonica to be on his/her back side) to prevent blocking of his/her vocals.

The "Harmonica Stand" of U.S. Pat. No. 4,212,219 to Hubbard includes a pole mounted on a floor stand, and which also has secured thereto a rod with a mounting bracket to hold a number of harmonicas, as well as a mounting sleeve with a microphone clip configured to position a microphone in close proximity to the harmonica. However, this apparatus requires the musician to move, i.e., to shift his entire body, back and forth laterally when changing between playing the harmonica and singing into the microphone, which back-and-forth movements are very labor intensive and detract from the musician's performance. U.S. Pat. No. 8,362,346 is similarly organized, but which has the support components arranged such that the harmonica is disposed below the microphone, so that the musicians needs to crouch down when trying to play the harmonica, which again detracts from the performer's ability to perform, particularly when also trying to play a second instrument, such as a guitar. Both of these approaches force the musician to unnecessarily manipulate his/her body while seeking to alternate between singing and playing the harmonica.

U.S. Pat. No. 9,430,995 to Paresi is for a "Harmonica Automatic Positioner," which includes a yoke that is worn over the shoulders of a user, and a harmonica support frame that is configured to hold a harmonica, where an actuator provides a force to actuate the support frame and the harmonica mounted thereto from an at rest position to an at ready position. A switch mechanism is configured to actuate the actuator, which switch may be a foot pedal. However, the construction of the harmonica automatic positioner of the '995 patent is inefficient, because it requires the use of a clutch mechanism to be able to lock the harmonica automatic positioner in the ready position. Moreover, the functionality provided with respect to the movement of the harmonica is very limited.

The herein disclosed apparatus provides improvements over these and other prior art harmonica holders.

It is noted that the citing of any reference within this disclosure, i.e., any patents, published patent applications, and non-patent literature, is not an admission regarding a determination as to its availability as prior art with respect to the herein disclosed and claimed apparatus.

OBJECTS OF THE INVENTION

It is an object of the invention to provide a device that may support a harmonica so that it may be played in a hands-free manner by a musician.

It is another object of the invention to provide a device that may support and be able to move a harmonica, so that it may be alternately played in a hands-free manner by a musician, and be subsequently moved away from the musician's mouth in a hands-free manner to facilitate better projection of the musician's singing.

It is a further object of the invention to provide a harmonica positioner device that has a sleek design that resembles a standard harmonica holder, such as the Hohner® FlexRac, to conceal its additional functionality, including that the harmonica can be raised and lowered with the toggling of a foot switch.

It is another object of the invention to provide a harmonica positioner device that can be raised and lowered by toggling of a switch, and which utilizes an encoder to detect rotation speed and rotation angle of a shaft of a motor to precisely control the motor to limit movement of the harmonica to multiple different selective positions.

It is also an object of the invention to provide a harmonica positioner device that can be actuated to raise and lower a harmonica by toggling of a switch on a foot pedal, which switch provides further functionality to enable pausing of the motion of the harmonica, and/or reversing of a direction of motion of the harmonica in between the extreme-most positions.

It is another object of the invention to provide a harmonica positioner device that can be actuated to raise and lower a harmonica by toggling of a switch on a foot pedal that wirelessly communicates with a radio chip in the harmonica positioner device using.

It is also an object of the invention to provide a harmonica positioner device that can be actuated to raise and lower a harmonica using a DC motor configured to be powered by rechargeable batteries.

It is another object of the invention to provide a battery-powered harmonica positioner device that can be actuated to raise and lower a harmonica, and which utilizes a USB port to receive a connector of a USB cable to recharge the batteries.

It is also an object of the invention to provide a harmonica positioner device that can be actuated to raise and lower a harmonica, and which is a more efficient to manufacture and requires fewer component parts.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment, the herein disclosed harmonica positioning device may broadly include a yoke member, a gear arrangement, a motor, a support frame, and a harmonica support member. The yoke member may have a first end, a second end, and a center portion between the first end and the second end, where the center portion is configured to be worn around and be supported by a portion of a neck of a user. The support frame may be particularly coupled to the yoke. The harmonica support member may be formed of a spring biased clamp member for releasably coupling to (e.g., for applying pressure to) and for supporting of a portion of a harmonica with respect tot eh support frame.

The gear arrangement, which may be housed between a pair of spaced apart plates, may include a plurality of gears rotatably mounted with respect to the spaced-apart housing plates. Note that the gears may alternatively be rotatably mounted with respect to housing that forms the yoke. A shaft may be rotatably mounted with respect to the housing plates. Additionally or alternatively, the shaft may be fixedly secured to a first gear of the plurality of gears, and may thus co-rotate with the first gear. The motor is configured to drive a second gear to rotate to cause each of the remaining other gears of the gear arrangement to rotate in a respective first direction, causing the shaft to similarly rotate as does the first gear. A portion of the support frame (e.g., a distal end of one of its arms) may be secured to the shaft to thereby rotate in accordance with the rotation of the first gear of the gear arrangement. The support frame may be formed to include a first arm, a second arm, and a center section configured to be worn around and be supported by a portion of a neck of a user, and the distal end of one of the arms of the support frame may be secured to the shaft. In another embodiment, there may be redundancy in the harmonica positioning device with respect to the motor and gear arrangement, i.e., having one set per side, so that the distal end of the first arm of the support frame may be secured to a first shaft of a first gear arrangement/motor on a first side of the yoke, and the distal end of the second arm of the support frame may be secured to a second shaft of a second gear arrangement/motor on a second side of the yoke.

The plurality of gears of each gear arrangement may be particularly constructed in such numbers and gear ratios to provide an amount of friction and a stall torque to hold the harmonica in an upright position while the user is playing the instrument and may be applying a force thereto, without the use of a locking mechanism.

The actuation of the support frame by the gear arrangement and motor, and thus movement of the harmonica, may be triggered by a switch. The switch may be any suitable switch known in the art. However, to be most effective, the switch may preferably be configured to be toggled by the musician's foot, and may thus be part of a foot pedal that may also communicate wirelessly with a processor that controls the motor.

The harmonica positioning device may further include an encoder that is configured to detect a rotation speed and a rotation angle of the shaft (and/or one of the gears) to be usable to control the motor to limit movement of the support frame to being at or in-between a first position and a second position, when the switch is toggled. Moreover, the switch of the foot pedal may be configured to be toggled only once to specifically move the support frame from the first position to the second position (or from the second position to the first position), and may also be programmed to provide additional functionality.

The switch of the foot pedal may also be programmed so that when it is quickly toggled twice, i.e., being toggled twice within a small threshold amount of time (e.g., less than one second), it may pause movement of the support frame (and thus pause movement of the harmonica) at its current position (i.e., a third position), being in between the first position and the second position. When the movement of the support frame is paused at the third position, and when the switch is thereafter toggled once again, the movement may resume in the same direction, but if the switch is thereafter again toggled twice within the threshold amount of time, the direction of movement will be reversed.

The motor is preferably a DC motor configured to be powered by one or more rechargeable lithium-ion batteries. The foot pedal may also be powered by rechargeable lithium-ion batteries, or may alternatively be powered by AC current obtained using a plug in a wall outlet or other source of AC current. The foot pedal may alternatively be USB powered. Each of the harmonica positioning device and the foot pedal may include a USB port that may be configured to receive a connector of a USB cable to provide power thereto and/or to recharge batteries respectively contained therein.

BRIEF DESCRIPTION OF DRAWINGS

FIG. 21 is a side view of an encoder that may be used with the motor of FIG. 18.

FIG. 22 is an end view of the encoder of FIG. 21.

DETAILED DESCRIPTION OF THE INVENTION

Figure 1A:
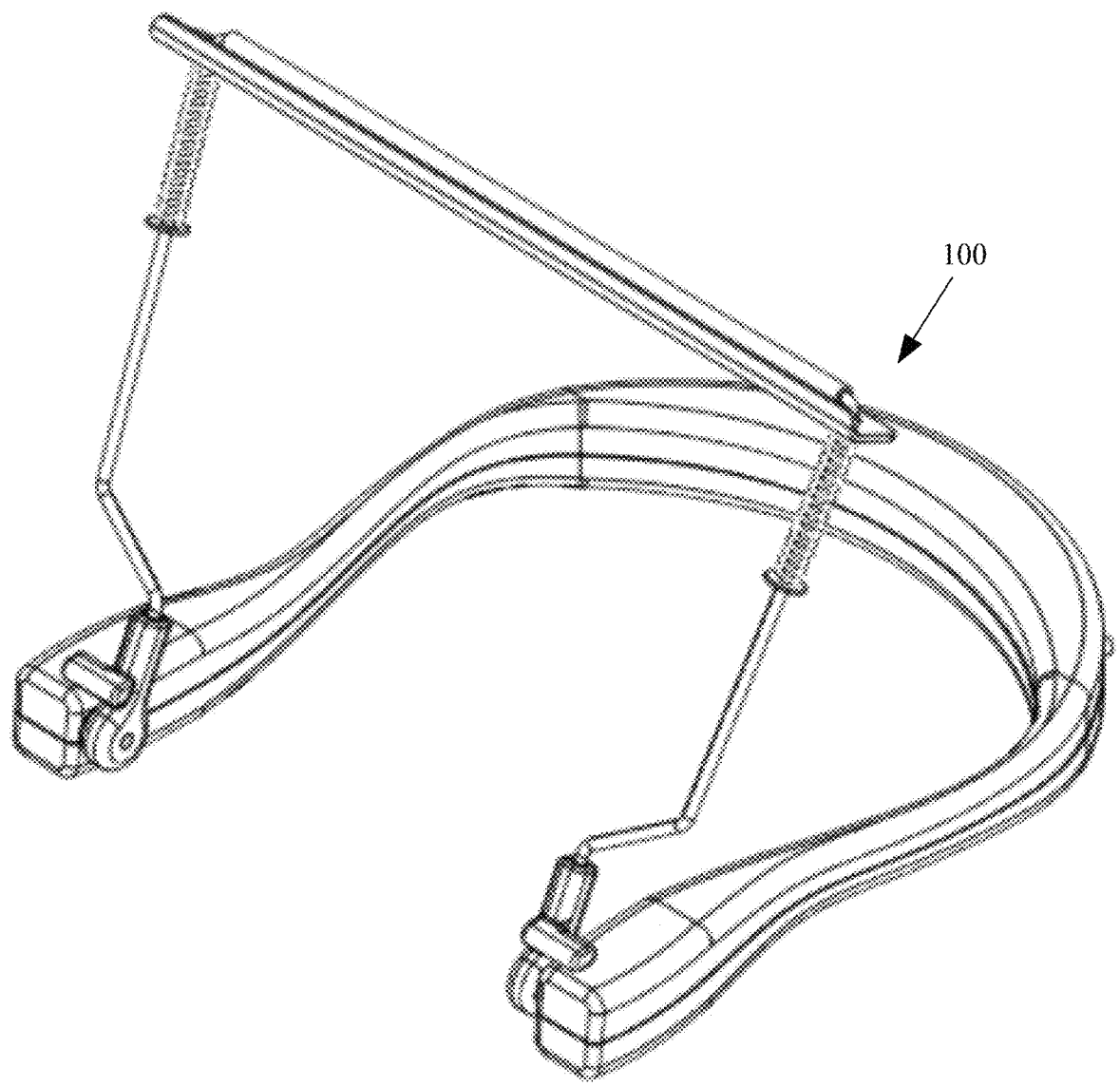
FIG. 1A is a first perspective view of an embodiment of the hands-free motorized harmonica positioning device described herein, shown with the support frame and the harmonica support member in the upper position permitting playing of the harmonica by the performer.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value or recitation modified by a term such as "about" or "substantially" is not to be limited to the precise theoretical characteristic or value specified, and may include values that differ from the specified value in accordance with design variations that may be described in the specification, as well as applicable case law. Also, in at least some instances, a numerical difference provided by the approximating language may correspond to the precision of an instrument that may be used for measuring the value or characteristic (e.g., recitation of being "substantially straight"). A numerical difference provided by the approximating language may also correspond to a manufacturing tolerance associated with production of the aspect/feature being quantified/described (see e.g., Ex Parte Ollmar, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole/recess) is larger than the part received therein (e.g., a shaft/protrusion), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: en.wikipedia.org/wiki/Engineering_fit; and "Three General Types of Fit," available at mmto.org/~dclark/Reports/Encoder%20Upgrade/fittolerences%20%5BRead-Only%5D.pdf.

FIG. 1A to FIG. 3 illustrate a harmonica positioning device 100, which may broadly include a yoke member 110, a support frame 120 that is movable with respect to the yoke member, a harmonica support member 130, a gear arrangement 150 (see FIGS. 18-20), a motor 110A, and electrical components.

Figure 4A:
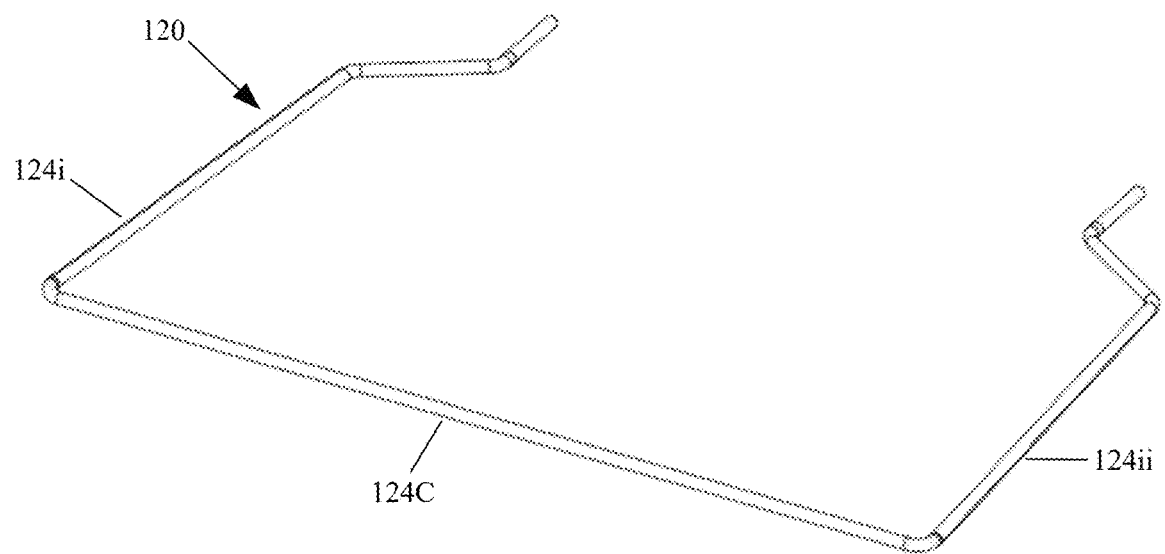
FIG. 4A is a perspective view of the support frame of the hands-free motorized harmonica positioning device of FIG. 1A.

The support frame 120 may be formed of any suitable material and any suitable cross-sectional shape, and is illustrated in the figures herein (e.g., FIG. 4A), merely to be exemplary, as being formed of a wire member 124 that has a straight center section 124C that transitions into a first leg 124i and a second leg 124ii. The first leg 124i and second leg 124ii may be parallel, and each may be oriented at roughly a ninety-degree angle to the center section. The center section 124C may have a pad or padding 125 fixedly secured to the wire (e.g., a rubber coating may be overlaid onto the wire).

Figure 4B:
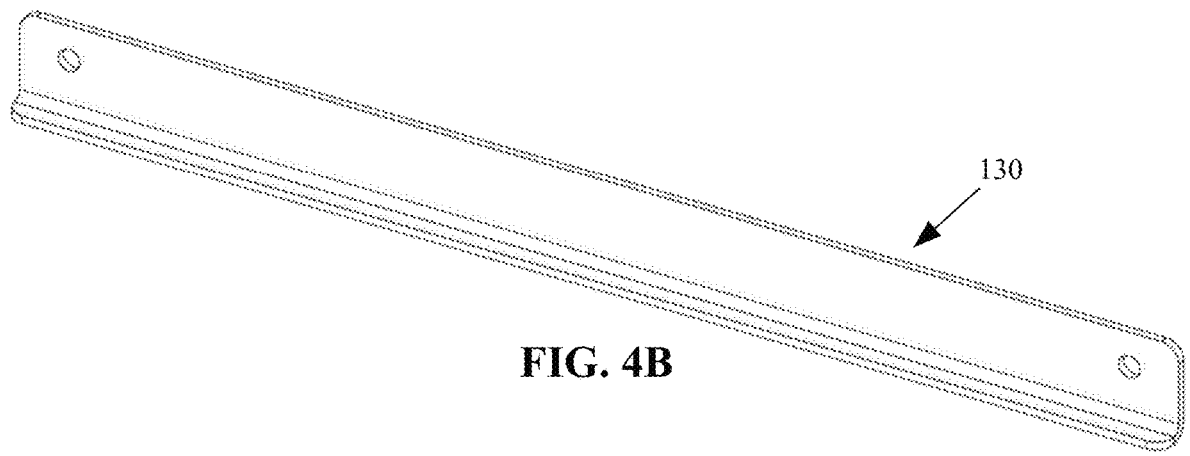
FIG. 4B is a perspective view of the harmonica support member of the hands-free motorized harmonica positioning device of FIG. 1A.
Figure 23:
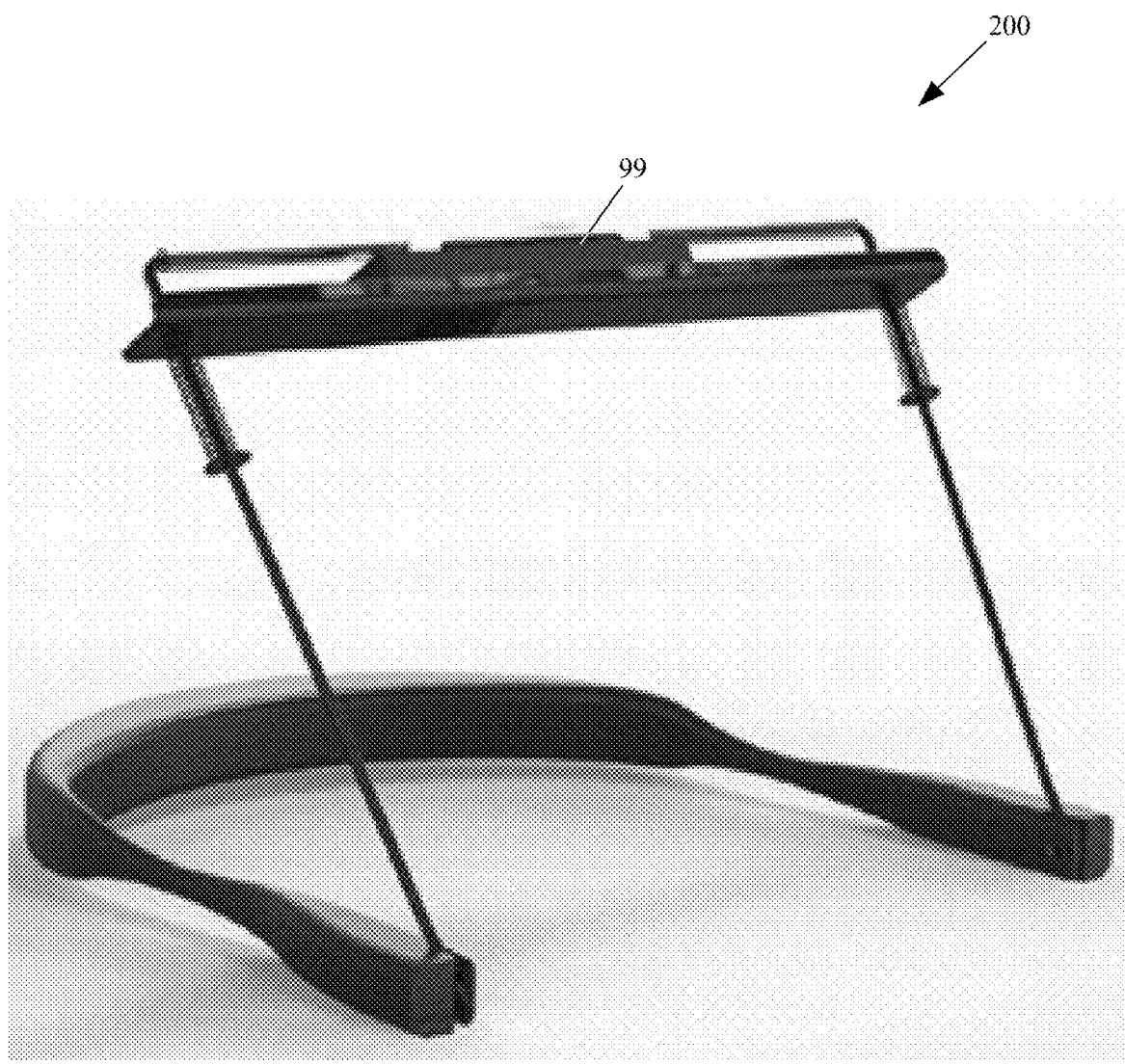
FIG. 23 is a perspective view of another embodiment of the hands-free motorized harmonica positioning device disclosed herein, which utilizes a different hinge arrangement for the support frame, and a different arrangement of components within the yoke housing.

The harmonica support member 130 may be slidably mounted to each of the first leg 124i and second leg 124ii of the support frame 120. The harmonica support member 130 may be formed as a flat plate or may be formed with a 90 degree flange (see e.g., FIG. 4B) to provide two orthogonal surfaces that may be used to support the harmonica 99 (see e.g., FIG. 23). One or both of those two surfaces of the harmonica support member 130 may be padded, e.g., a resilient member may be attached to the support member, or the support member may be coated with a resilient material, e.g., being rubber coated; or the support member may itself be a material that in essence is padded as it may not scratch of harm the harmonica, e.g., the support member itself may be formed of a flexible polyvinyl chloride, or a stiffer rubber material such as a rigid polyvinyl chloride, or even EPDM (ethylene propylene diene monomer) rubber.

The harmonica support member 130 may also be biased towards the center section 124C by one or more springs 127. The biasing provided by springs 127 may serve to releasably secure (i.e., to clamp without causing damage) a harmonica between the harmonica support member 130 and the center section 124C of the support frame 120 (or its padding when padding is utilized).

The yoke member 110, as seen in more detail in FIGS. 5-12, may have a center portion 110C that may be generally semi-circular in shape, and as such may be configured to be ergonomically worn around, and be supported by, a portion of a neck of a user-musician. The center portion 110C may have one side that transitions into a first arm 111A which may terminate at a first end 111, and another side that transitions into a second arm 112A which may terminate at a second end 112.

Figure 13:
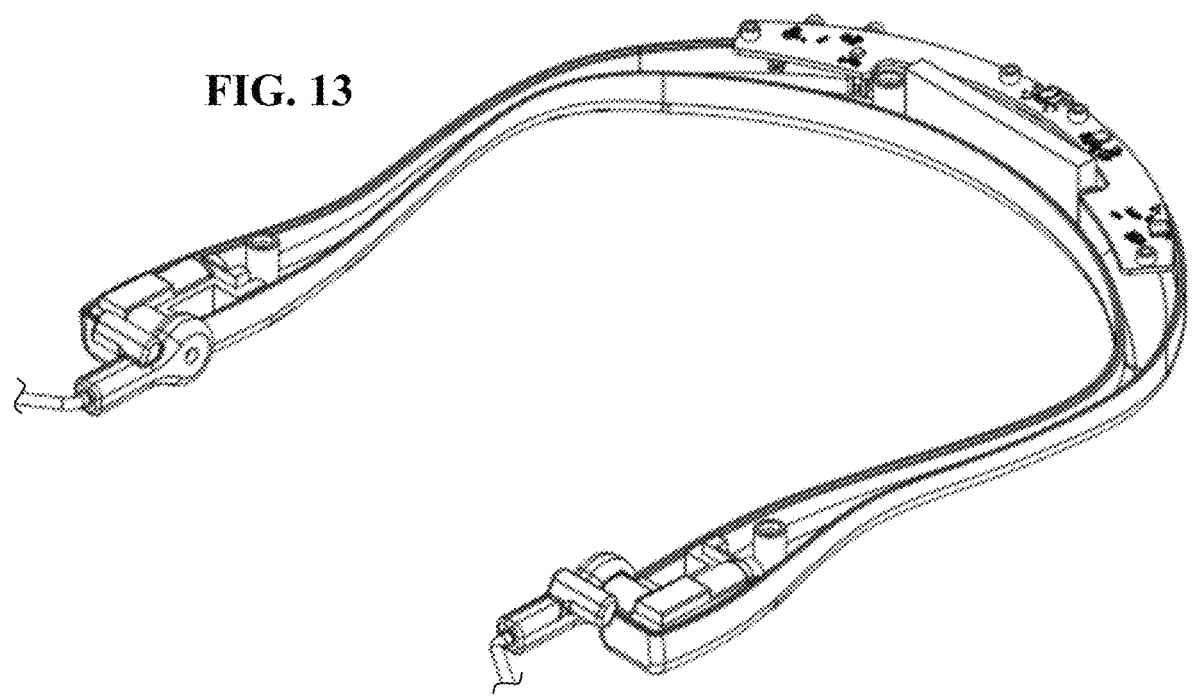
FIG. 13 is a first cut-away perspective view of the yoke with the top casing portion of the housing removed to expose the component parts that are housed therein.
Figure 14:
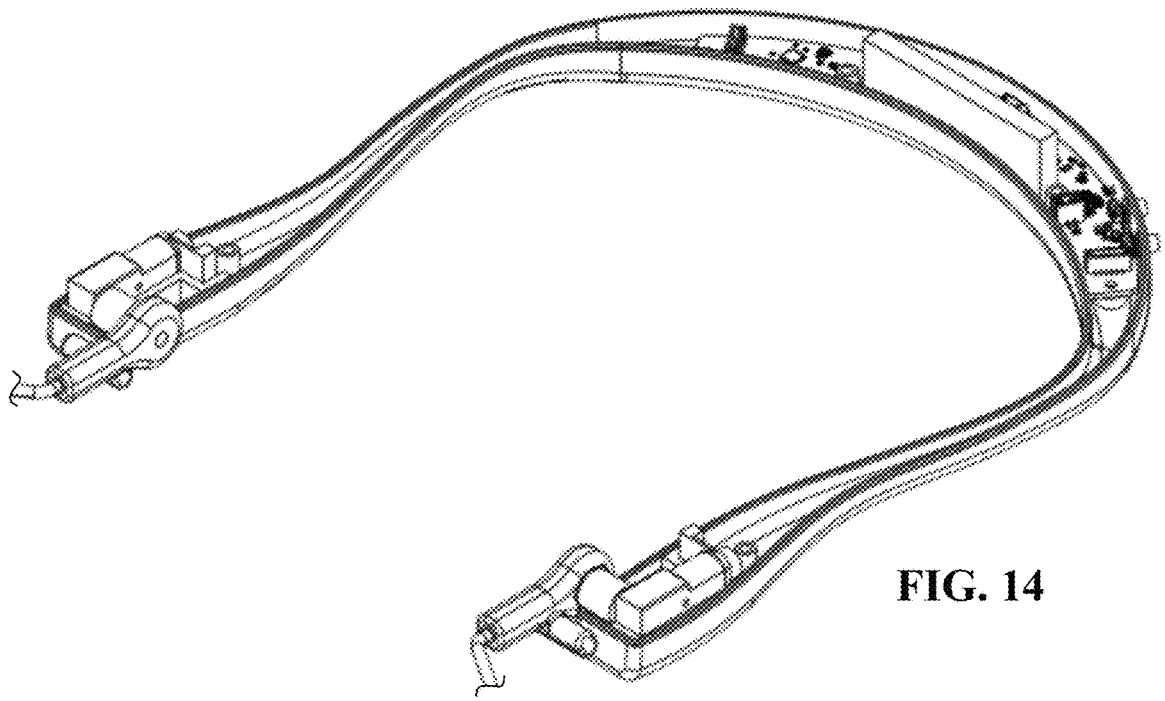
FIG. 14 is a second cut-away perspective view of the yoke with the bottom casing portion of the housing removed to expose the component parts that are housed therein.
Figure 15:
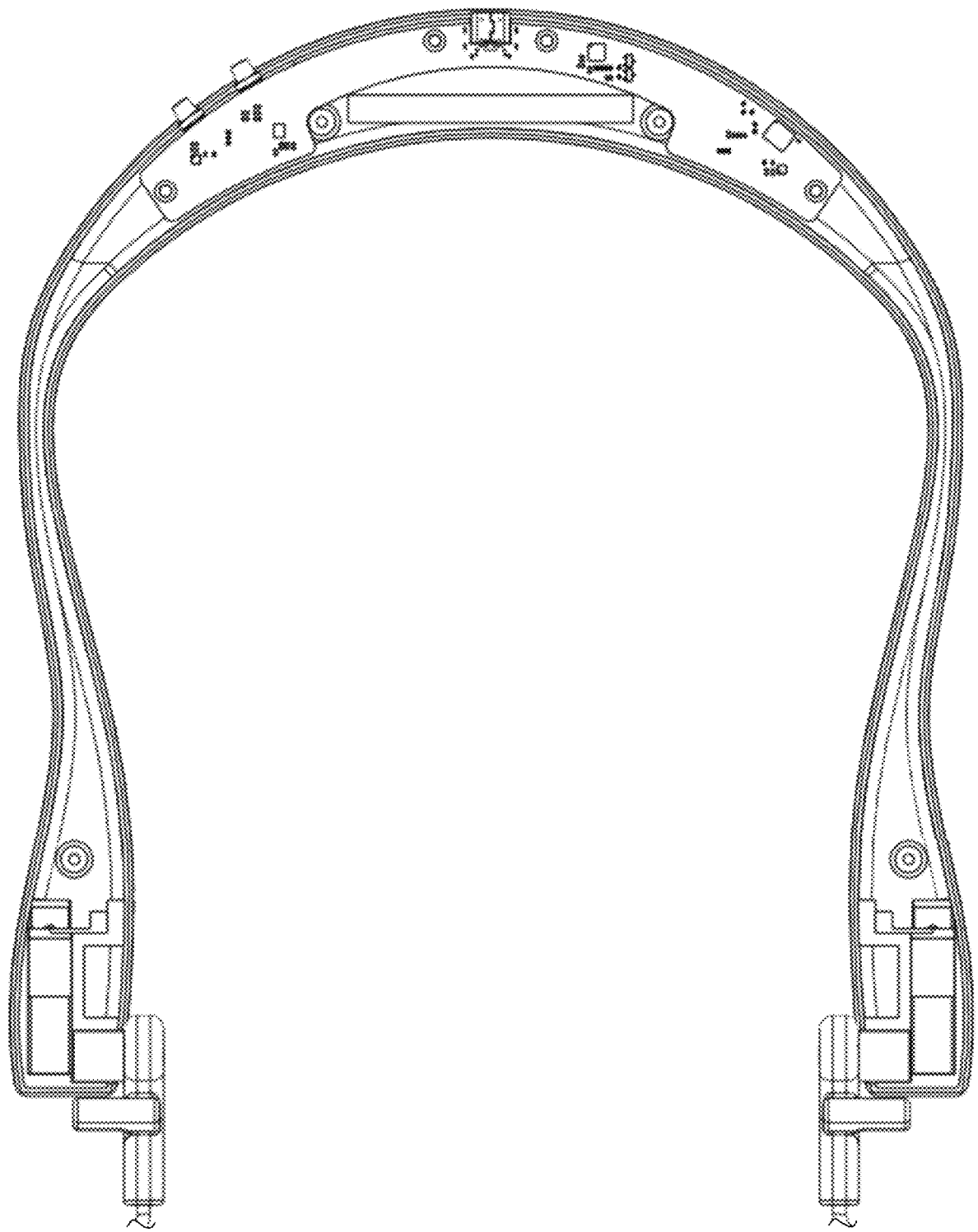
FIG. 15 is a front view of the yoke showing the internal components seen in FIG. 13.
Figure 16:
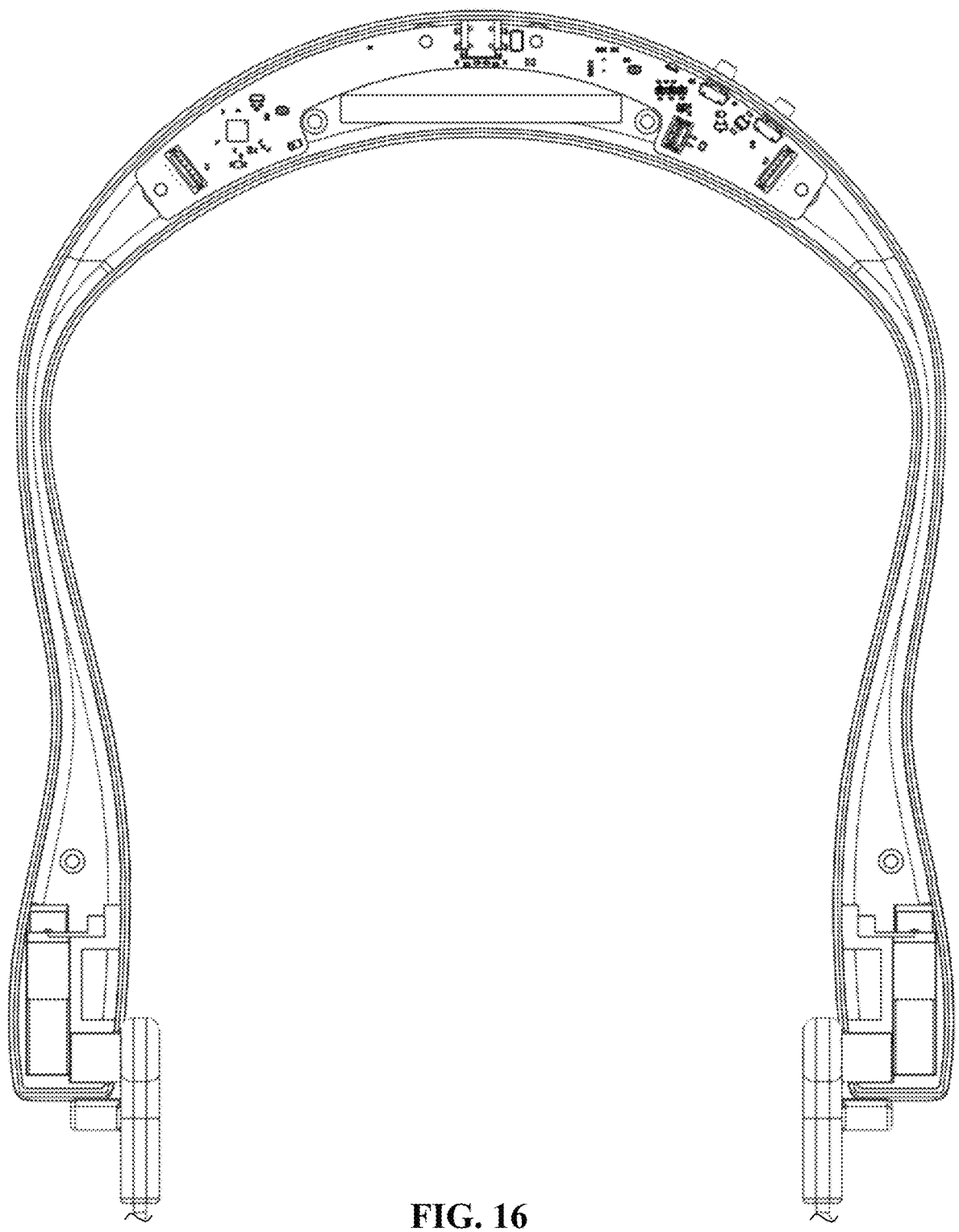
FIG. 16 is a rear view of the yoke showing the internal components seen in FIG. 14.

As may be understood from the views of FIGS. 13-14, the housing of the yoke member 110 may be hollow so that it may house many of the component parts of the harmonica positioning device 100. In one embodiment, the yoke member 110 may be formed of two or more pieces to permit ease of assembly of those component parts into the yoke member, e.g., being formed into two halves that are joined together, such as at the yoke centerline 110C shown in FIG. 11.

The yoke member 110 may include only one motor 170, which may be disposed proximate to the first end 111 of the yoke member. In one embodiment, the motor 170 may be a 6V DC worm drive motor, however, any suitable motor known in the art may alternatively be utilized. The motor 170 may be controlled by interfacing with a motor driver integrated circuit 171, and a processor 172. In one embodiment, the motor driver integrated circuit may be the Texas Instruments L293D, and the processor may be an Arduino Nano, as such an arrangement (as well as other combinations) is/are particularly configured to control both the speed and the spinning direction of the motor 170, to spin in a first direction and in a second direction (i.e., spinning clockwise and counterclockwise). Note that for the embodiment shown in FIGS. 23-24 (harmonica positioning device 200), the motor driver integrated circuit 171 and the processor 172 may be separated by a pair of batteries 98.

Figure 18:
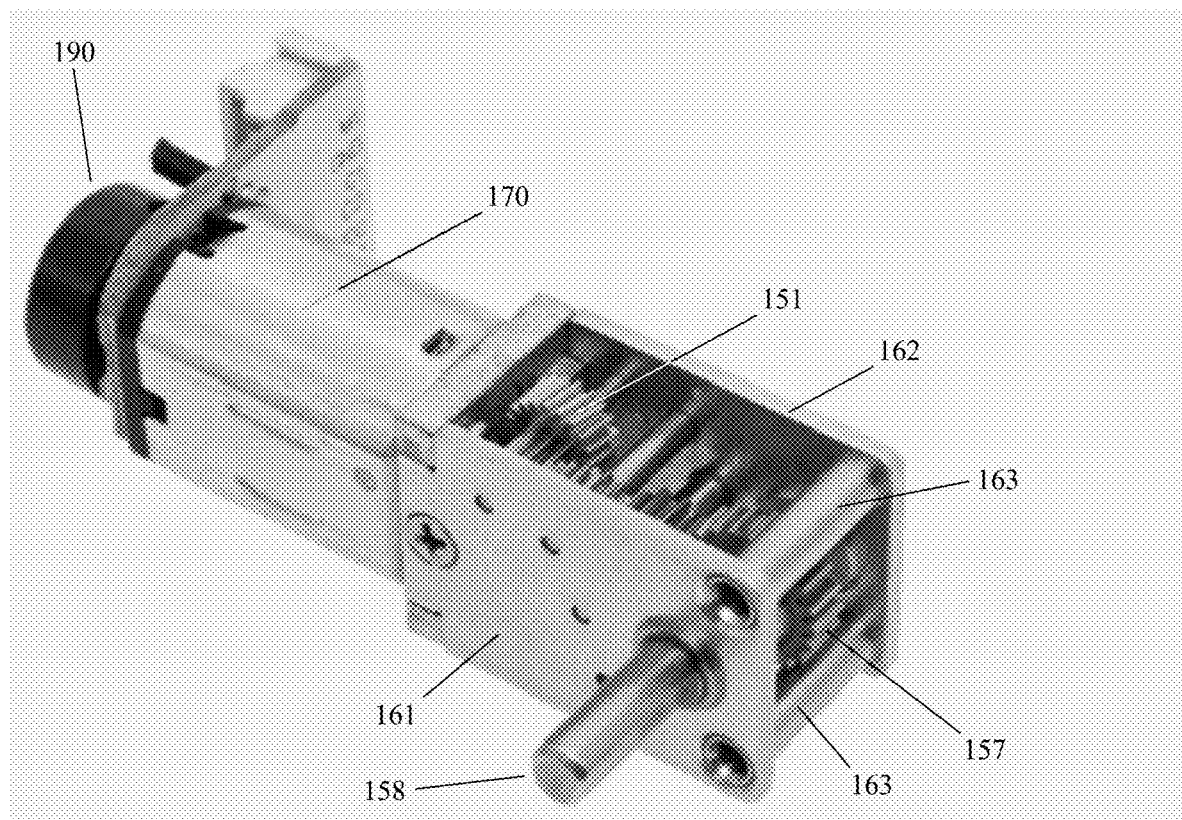
FIG. 18 is a perspective view showing a motor, an encoder, and a gear arrangement.
Figure 19:
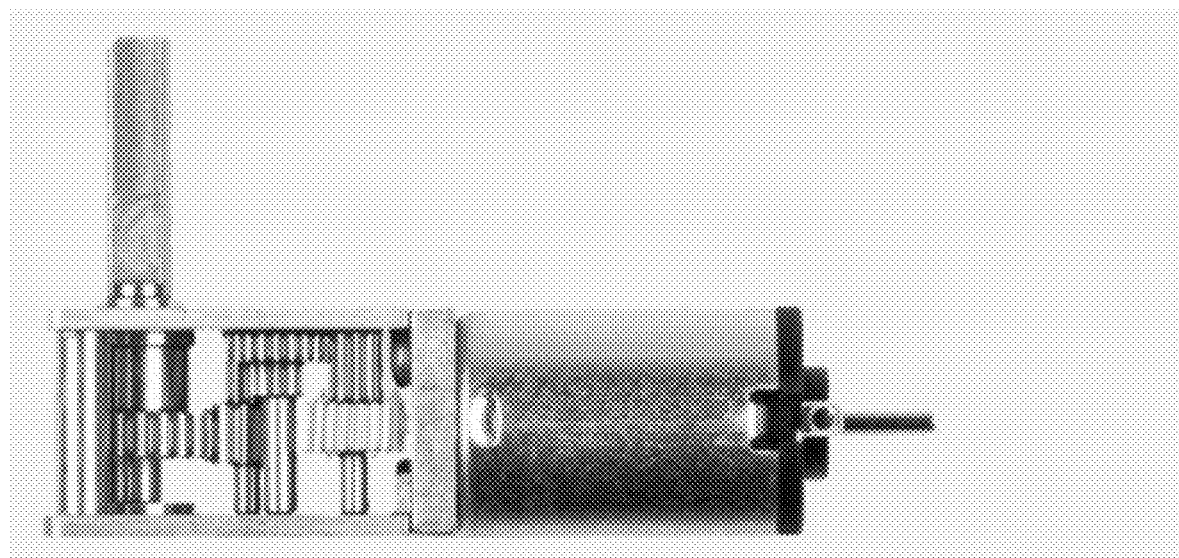
FIG. 19 is a top view showing a motor, and a gear arrangement without the use of an encoder.
Figure 20:
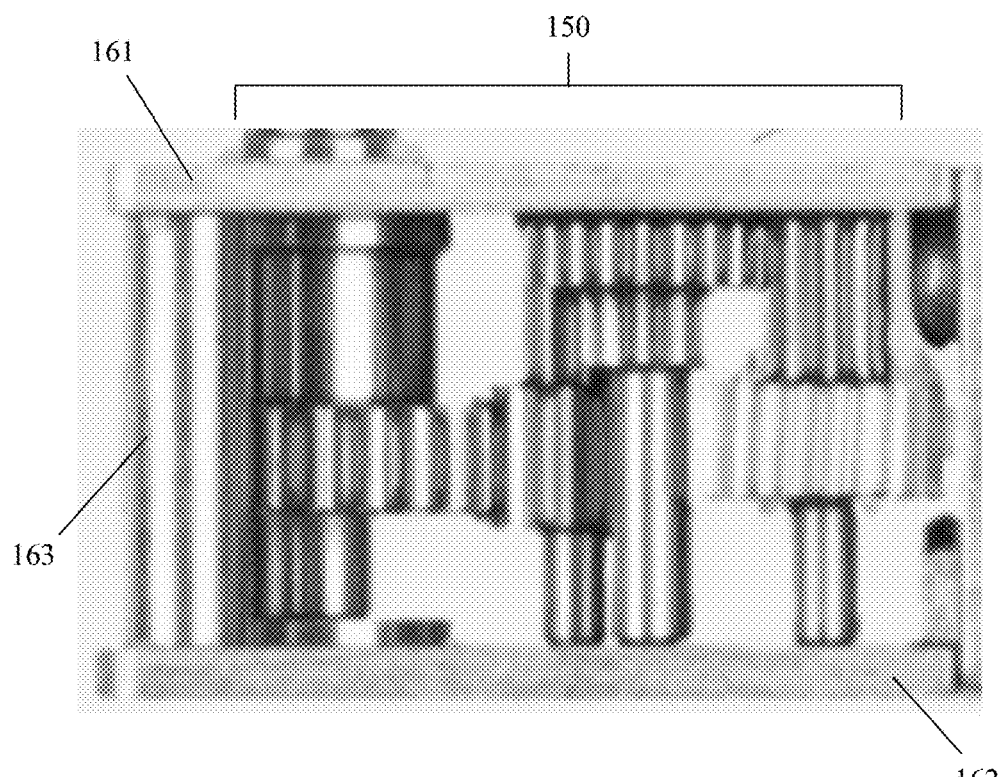
FIG. 20 is an enlarged detail view of the gear arrangement shown in FIGS. 18-19.

The motor 170 may actuate a gear arrangement 150 that may be seen in FIGS. 18-19, and is shown in more detail in the view of FIG. 20. It is noted that other gear arrangements may alternatively be used. The gear arrangement 150 may be housed within a box-like enclosure of motor 150' (see FIGS. 24-25), or may alternatively and more simply be housed between a pair of spaced apart plates 161 and 162, which plates may be spaced apart using, for example, one or more spacers 163. Note that the gear arrangement may alternatively be rotatably mounted within the yoke member, without the use of the spaced apart plates. The gear arrangement 150 may include a plurality of gears rotatably mounted with respect to the plates 161 and 162, where a one of the gears—e.g., gear 151—may be configured to be driven by the motor 170, and another gear-gear 157—may be configured to be driven to rotate in accordance with the corresponding gear ratios of the gear combination utilized. The gear 157 may be configured to co-rotate with a shaft 158 that may be fixedly secured thereto, and which shaft may also rotatably support the gear 157, e.g., by rotatably mounting the shaft 158 to the plates 161 and 162.

Figure 1B:
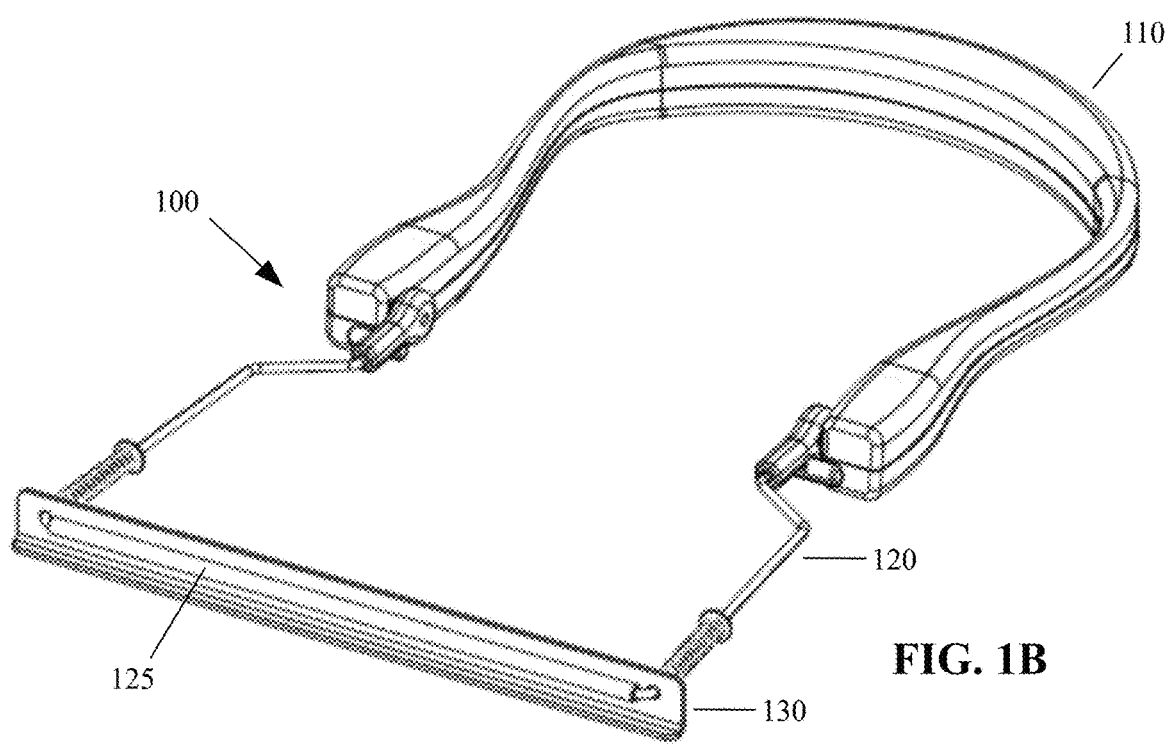
FIG. 1B is a second perspective view of the hands-free motorized harmonica positioning device of FIG. 1, shown with the support frame and the harmonica support member in the lowered position, to locate the harmonica away from the performer's mouth permitting better projection of the performer's vocals.
Figure 2:
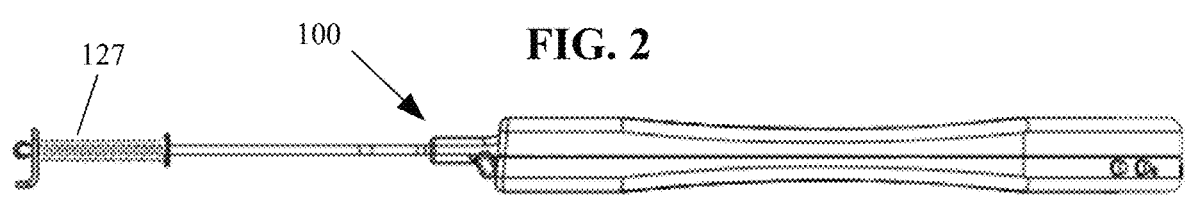
FIG. 2 is a side view of the hands-free motorized harmonica positioning device of FIG. 2, shown with the harmonica support member biased into direct contact with the center portion of the support frame as no harmonica is being supported therebetween.
Figure 3:
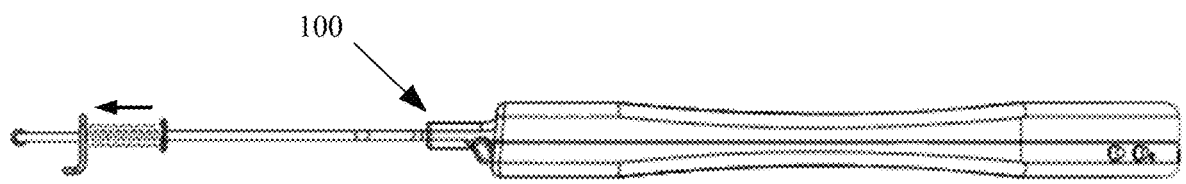
FIG. 3 is the side view of FIG. 2, but shows the harmonica support member after being translated against the biasing force of the spring, to provide a gap with respect to the center portion of the support frame, permitting insertion of a harmonica therebetween.

The motor 170 may thereby be configured to drive the gear 151 of the plurality of gears of the gear arrangement 150 to rotate an angular amount in a first direction and to alternatively drive the gear 151 to counter-rotate the angular amount in a second direction, to thereby drive each of the plurality of gears to rotate in a respective first direction, and to correspondingly counter-rotate in a respective second direction. Rotation of the gear 151 in the first direction causes corresponding rotation of the shaft 158, and thereby causes corresponding rotation of the support frame 120 from a first support frame position (e.g., FIG. 1A) to a second support frame position (FIG. 1B). Also, counter-rotation of the first gear in the second direction causes corresponding counter-rotation of the shaft 158 to thereby cause corresponding counter-rotation of the support frame from the second support frame position to the first support frame position The plurality of gears of the gear arrangement 150 may thereby also be particularly constructed in such numbers and combinations of gear ratios (see e.g., the six gears in FIG. 20) to provide an amount of friction and a stall torque to hold the harmonica support member 120 (and thus the harmonica) in the upright position of FIG. 1A while the user is playing the supported harmonica, without the need for a dedicated locking mechanism. While the musician is playing the harmonica, he/she may be applying a force thereto as a result of the contact of his/her mouth with the instrument, and also the force resulting from blowing air through the harmonica. In one embodiment, the plurality of gears of the gear arrangement 150 may be particularly constructed to provide friction and stall torque sufficient to resist 1-3 pounds of force being applied by the user, and in another embodiment, the friction and stall torque may be able to resist 1-5 pounds of force being applied by the user, and in yet a further embodiment, the friction and stall torque may be able to resist 1-20 pounds of force, and in other embodiments, the friction and stall torque may be able to resist other force amounts.

Figure 5:
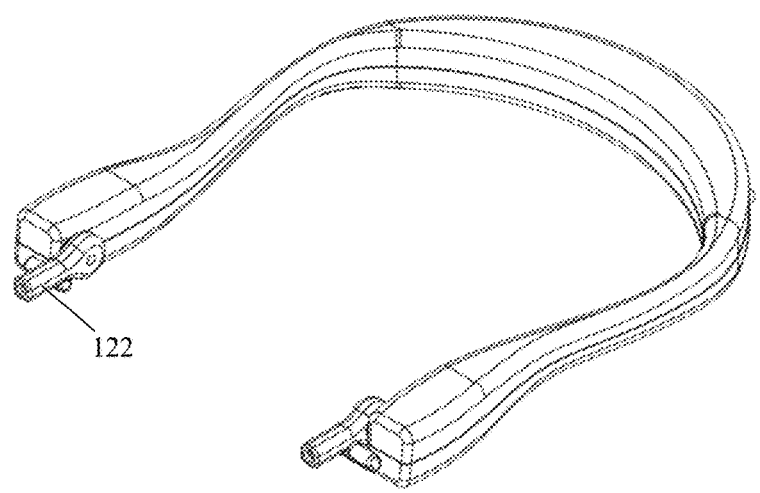
FIG. 5 is a side view of the yoke portion of the hands-free motorized harmonica positioning device of FIG. 1, and the wire holder arm.
Figure 6:
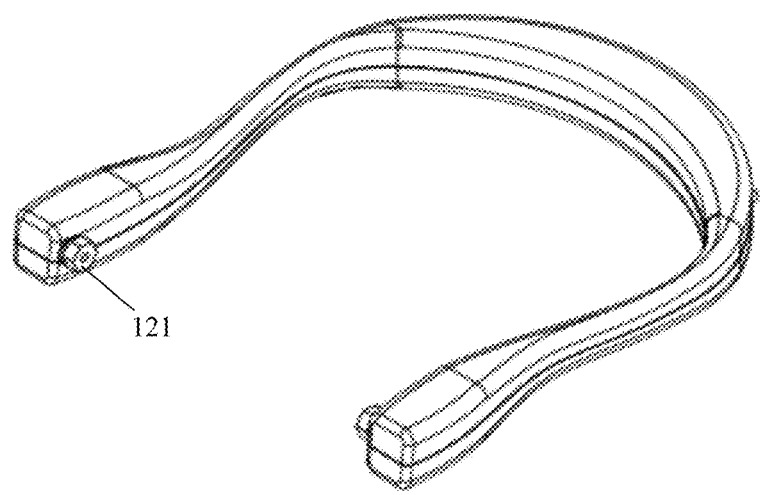
FIG. 6 is the side view of FIG. 5, but is shown with the wire holder arm removed to expose the motor coupling.
Figure 7:
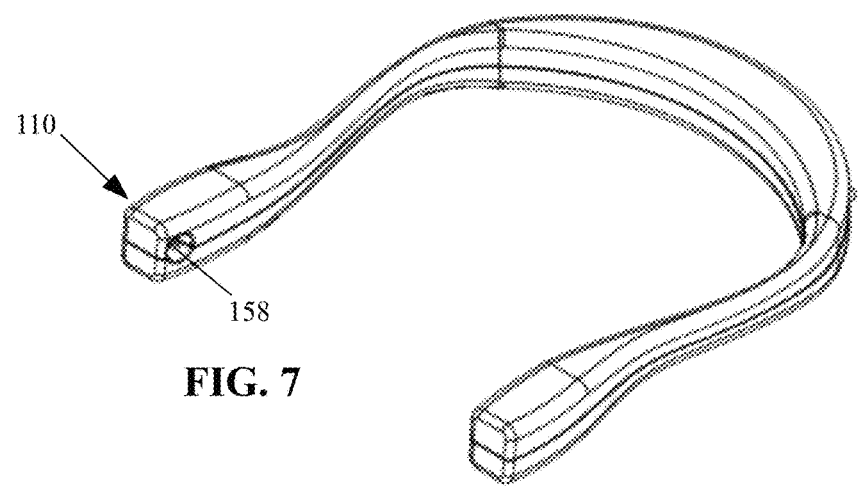
FIG. 7 is the side view of FIG. 6, but is shown with the motor coupling removed to expose the shaft of the DC motor.
Figure 10:
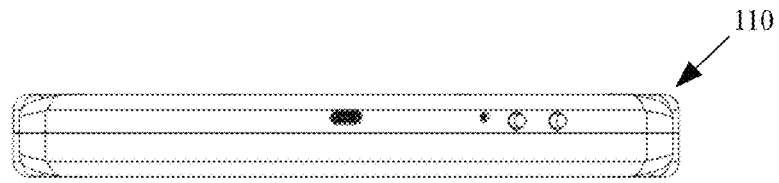
FIG. 10 is a top view of the yoke portion of the hands-free motorized harmonica positioning device as seen in FIG. 8.
Figures 8, 11, 12:
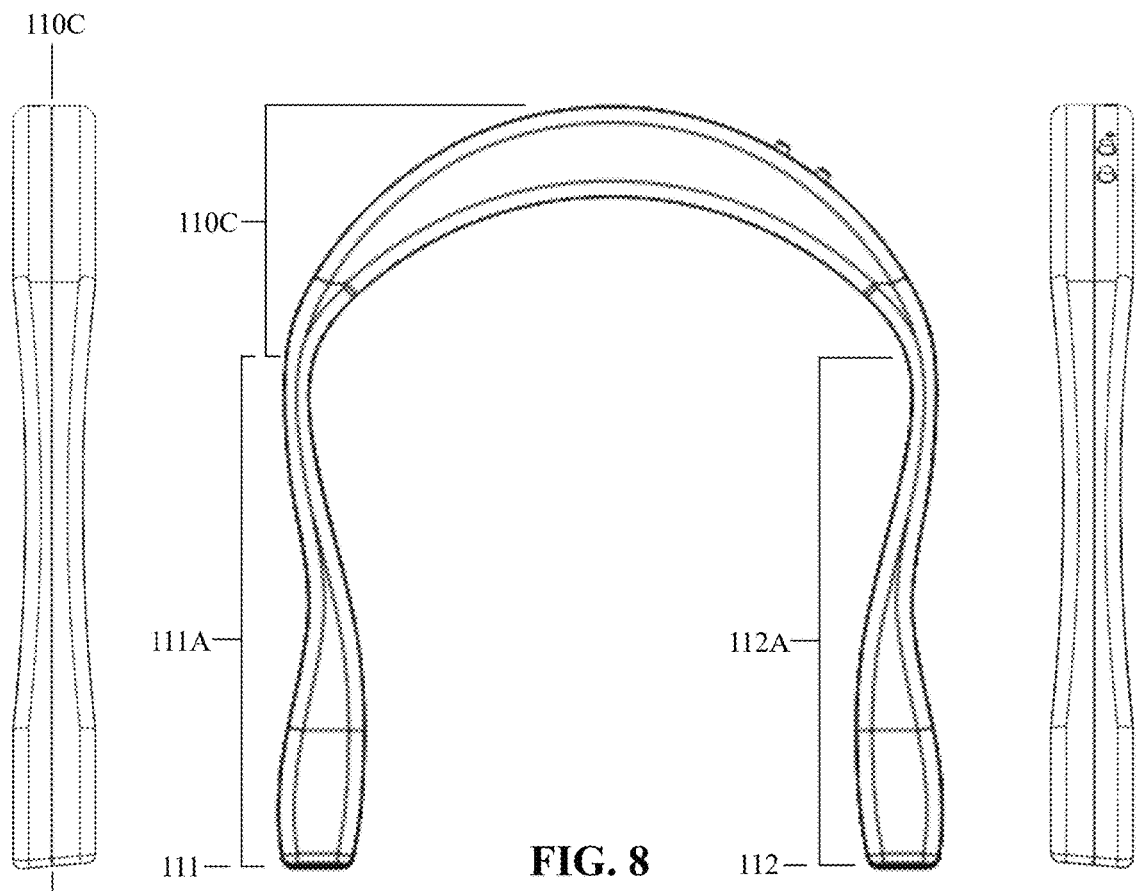
FIG. 8 is a front view of the yoke portion of the hands-free motorized harmonica positioning device as seen in FIG. 7.
FIG. 11 is a first side view of the yoke portion of the hands-free motorized harmonica positioning device as seen in FIG. 8.
FIG. 12 is a second side view of the yoke portion of the hands-free motorized harmonica positioning device as seen in FIG. 8.
Figure 9:
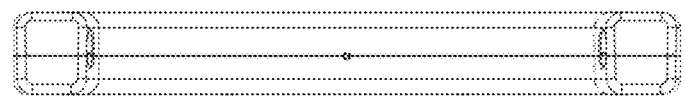
FIG. 9 is a bottom view of the yoke portion of the hands-free motorized harmonica positioning device as seen in FIG. 8.

As may be understood from FIGS. 5-7 and FIGS. 25-26, the support frame 120 may be movable with respect to the yoke member 110 by having at least one of the ends of the wire member (i.e., the end of the first leg 124i or the end of the second leg 124ii) being directly or indirectly secured to the shaft 158 of the gear arrangement 150. The end of the leg may be secured to the shaft 158 of the gear arrangement 150 using any suitable joining technique, including, but not limited to, using: adhesive, mechanical fasteners (rivets, screws, bolt/nut combinations, etc.), a friction fit, welding, etc., and/or any combination of such techniques. For example, as seen in FIGS. 5-7, the shaft 158 may be coupled to the support frame 120 using a motor coupler 121 that is joined to the shaft, and a holder arm 122 that is joined to the motor coupling. As seen in the embodiment in FIGS. 25-26, the end of the leg 124i'/124ii' of the support frame 120 may loop around the shaft 158' and may be fixedly secured thereto.

In one embodiment, one motor and gear arrangement may be used to drive only one leg of the support frame 120. In another embodiment, as shown in the figures (see e.g., FIG. 13 and FIG. 24), two motors 170 and two gear arrangements 150 may be used to one arrangement drives one of the two legs, and may provide redundancy, smoother movement, and balanced weighting of the device when worn upon the neck of the musician. The motors 170 may respectively be located proximate to the ends 111/112 of the yoke member 110.

Figure 17:
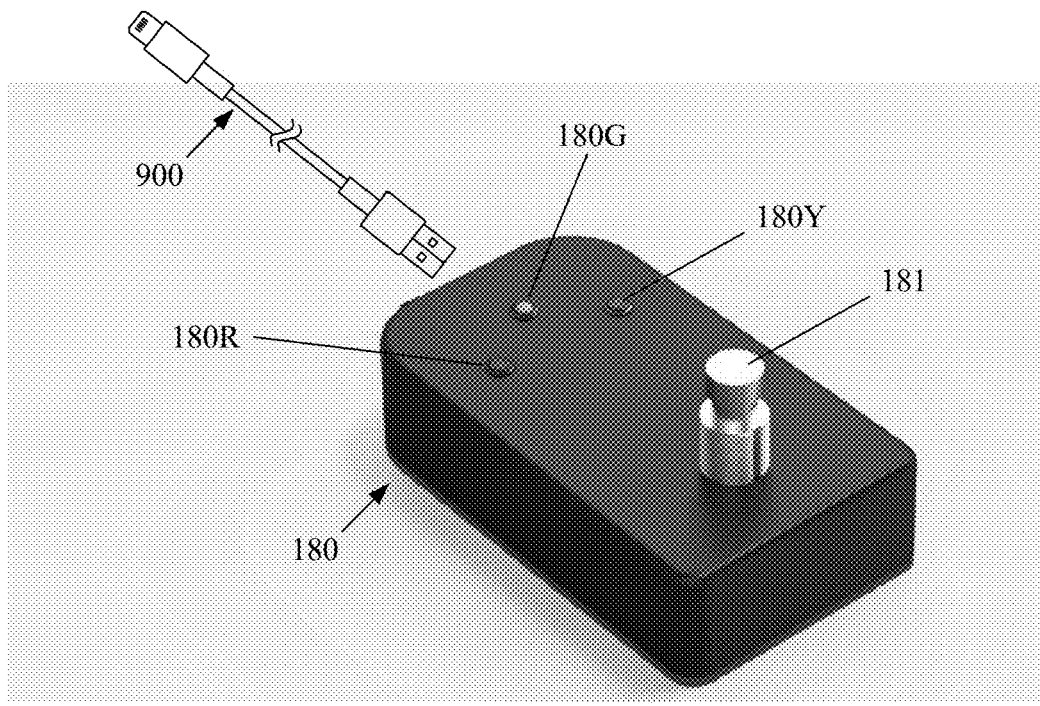
FIG. 17 is a perspective view of switch that may be toggled to trigger the motor to move the harmonica that is supported by the harmonica positioning device of FIG. 1.

The actuation (and movement) of the support frame 120 by the motor(s) 170, and thus movement of the harmonica, may be triggered by a switch accessible to the musician during a performance. The switch may be any suitable switch known in the art. However, to be most effective, the switch may preferably be configured to be toggled by the musician's foot. In one embodiment, a switch 181 (FIG. 17) may be part of a foot pedal assembly 180 that may be configured to communicate switch positions/commands wirelessly with the processor that controls the motor driver and the motors 170. The foot pedal assembly 180 may have its own Arduino processor, and the harmonica positioning device 100 may utilize one or a pair of radio chips 182 to communicate switch positions/commands wirelessly from the processor in the pedal to the processor in the yoke member 110. In one embodiment, a pair of NRF24L01 transceiver modules with onboard antennas (made by Nordic Semiconductor) may facilitate the communication of switch commands from the Arduino processor in the foot pedal assembly 180 to the Arduino processor 172 in the yoke member 110 (e.g., one NRF24L01 transceiver module in the yoke member and one NRF24L01 transceiver module in the pedal assembly 180). The foot pedal assembly 180 may also have a red LED 180R, a green LED 180G, and a yellow LED 180Y, as indicated in FIG. 17, to indicate the operational state of the foot pedal—with green indicating it is fully functional, red indicating at least one aspect being non-functional (e.g., being completely non-functioning due to no available power), and yellow indicating low battery power.

The harmonica positioning device 100 may further include one or more (e.g., a pair) of encoders 190 (see e.g., U.S. Pat. No. 5,793,128 to Nanba; U.S. Pat. No. 7,187,305 to Ellis; and U.S. Pat. No. 10,447,119 to Sangermann). The encoder 190 may be a magnetic encoder. Each of the encoders may be configured to detect a rotation speed and a rotation angle of the respective shaft of the motor 170 to control the motor to precisely limit movement of the support frame 120 between the first position and the second position, when the switch 181 is toggled, where the first position may be the in-use position for playing of the harmonica by the musician (FIG. 1A), and the second position may be a distal position (FIG. 1B). Note that the distal position may be a position at which the wire 124 is substantially in the same plane as (or substantially parallel to) the center 102C of the yoke member 110, as seen in FIG. 1B. In one embodiment, the encoders 190 that are used may each be a micro metal motor encoder (MMME).

Therefore, through use of the encoders 190, the harmonica positioning device 100 may be programmed so that if the switch 181 is toggled only once, it will cause the support frame 120 to move between the first position and the second position (i.e., when in the first position, toggling once would cause it to move into the second position, and vice versa).

The harmonica positioning device 100 may also be programmed to provide additional functionality, as follows. When the switch 181 is quickly toggled twice, i.e., being toggled twice within a small threshold amount of time (e.g., within about one to two seconds), it will cause movement of the support frame 120 to pause at an intermediate position, being a third position in between the first position and the second position. When the movement of the support frame 120 is paused at the third position, and when the switch 181 is toggled once again, its movement resumes in the same direction. Also, when the movement of the support frame 120 is paused at the third position, and when the switch 181 is toggled twice within the threshold amount of time, the direction of movement will be reversed. This allows the musician to pause the harmonica at an intermediate position that may be closer to his or her mouth than the stowed position, to facilitate very quick changes between harmonica playing and his/her vocalizing of lyrics.

Figure 24:
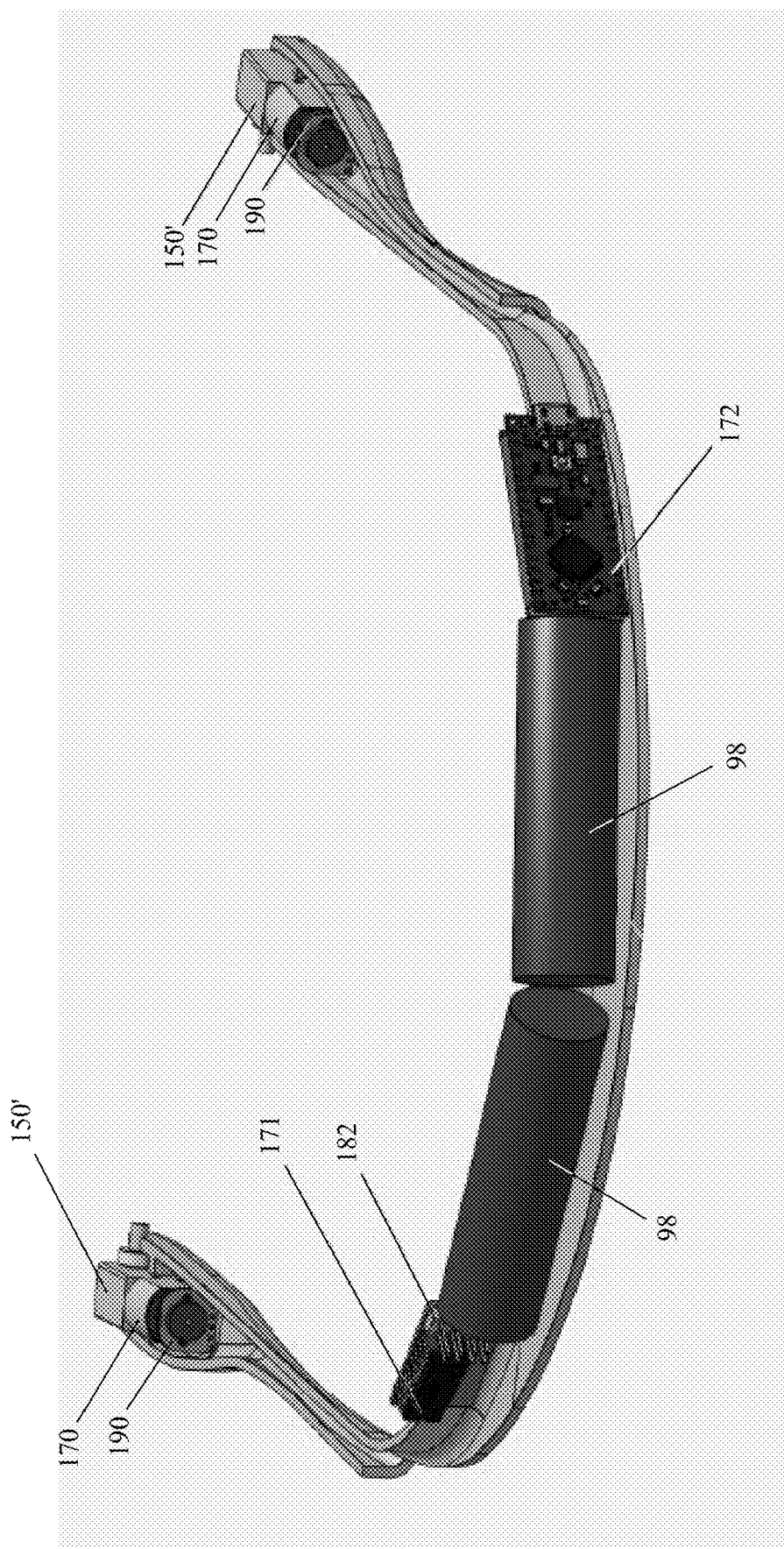
FIG. 24 is a cutaway perspective view of the embodiment of FIG. 23.
Figure 25:
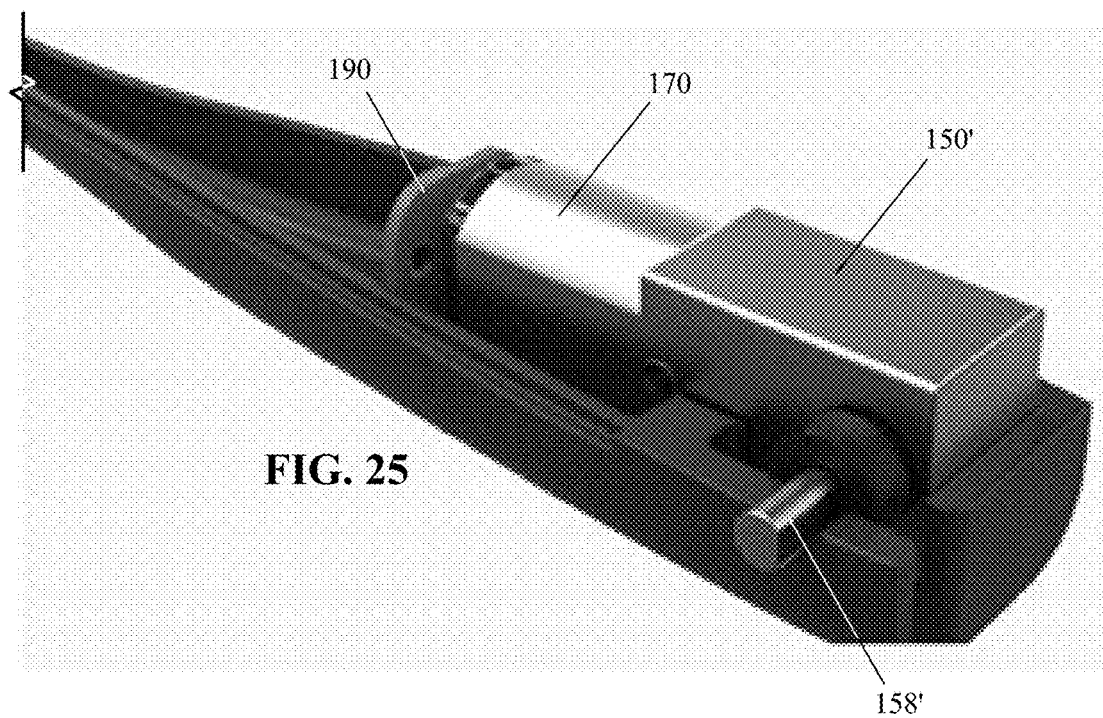
FIG. 25 is a perspective view of the distal end of one side of the yoke, showing the encoder and motor housed therein, with a shaft of the arrangement protruding from the gear box housing and the yoke housing.
Figure 26:
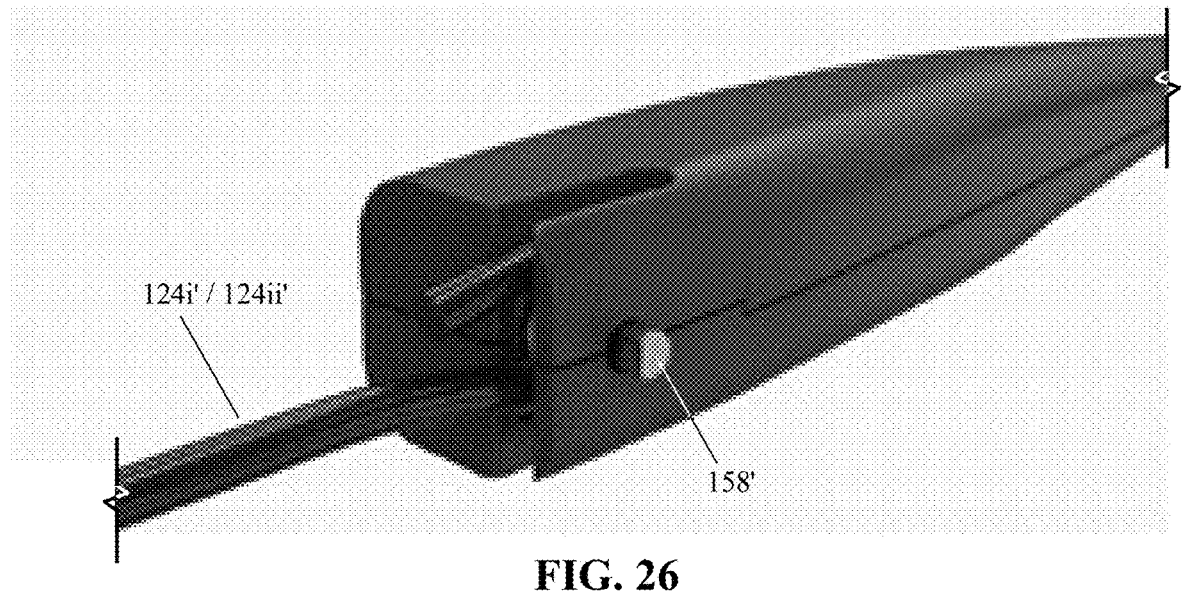
FIG. 26 is a perspective view of the distal end of the yoke shown in FIG. 25, but is shown both halves of the yoke housing coupled together to enclose the motor and encoder, with the support frame coupled to the shaft.

The harmonica positioning device 100 may be powered by one or more batteries 98, which may be rechargeable lithium-ion batteries, and which may be housed in the yoke member 110, as seen, for example, in FIG. 24. In one embodiment, the harmonica positioning device 100 may be powered by two 18650 lithium-ion batteries.

The foot pedal assembly 180 may also be powered by rechargeable lithium-ion batteries, or may alternatively be powered by AC current obtained using a conventional plug inserted into a wall outlet or other source of AC current (which may require use of an AC motor or use of an AC to DC converter). The foot pedal assembly 180 may alternatively use USB power. The harmonica positioning device 100 and the foot assembly 180 may each include a USB port (see e.g., U.S. Pat. No. 7,553,172 to Chiu) that is configured to receive a connector (see e.g., U.S. Pat. No. 6,981,887 to Mese) of a USB cable 900 (see FIG. 17) to provide power thereto, and/or to recharge any batteries being utilized.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A harmonica positioning device comprising:
   a yoke member, said yoke member having a first end, a second end, and a center portion between said first end and said second end, being configured to be worn around and be supported by a portion of a neck of a user;
   a support frame, said support frame having a first arm, a second arm, and a center section, a distal end of said first arm being pivotally mounted to said first end of said yoke member;
   a support member, a first portion of said support member being slidably mounted to said first arm, and a second portion of said support member being slidably mounted to said second arm;
   at least one spring, said at last one spring configured to bias said support member to slide towards said center portion of said support frame;
   a gear housing;
   a gear arrangement, said gear arrangement comprising:
      a plurality of gears, each gear of said plurality of gears being rotatably mounted in said gear housing, and being configured to rotatably engage an adjacent gear of said plurality of gears;
      a shaft, said shaft being rotatably mounted to said gear housing; said shaft being fixedly secured to a first gear of said plurality of gears to co-rotate with said first gear;
   wherein a distal end of said second arm is fixedly secured to said shaft;
   a motor, said motor configured to drive a second gear of said plurality of gears to rotate an angular amount in a first direction and to alternatively drive said second gear to counter-rotate said angular amount in a second direction, to thereby drive said first gear to rotate in a respective first direction and to counter-rotate in a respective second direction;
   wherein said respective rotation of said first gear in the first direction causes corresponding rotation of said shaft, and thereby causes corresponding rotation of said support frame from a first support frame position to a second support frame position; and
   wherein said respective counter-rotation of said first gear in the second direction causes corresponding counter-rotation of said shaft to thereby cause corresponding counter-rotation of said support frame from said second support frame position to said first support frame position.

2. The harmonica positioning device according to claim 1, wherein said motor and said plurality of gears are configured to provide friction and a stall torque to maintain said support frame in said second support frame position while the user is playing the harmonica, without using a dedicated locking mechanism.

3. The harmonica positioning device according to claim 2, further comprising: a switch configured to be toggled to trigger said motor to actuate said support frame to move between said first support frame position and said second support frame position.

4. The harmonica positioning device according to claim 3, further comprising: an encoder, said encoder configured to detect a rotation speed and a rotation angle of said motor to control said motor to limit movement of said support frame between said first support frame position and said second support frame position when said switch is toggled.

5. The harmonica positioning device according to claim 4, wherein said switch is further configured to be toggled once to move said support frame directly between said first support frame position and said second support frame position.

6. The harmonica positioning device according to claim 5, wherein said switch is further configured to be toggled twice within a threshold amount of time to pause movement of said support frame at a third position being in between said first support frame position and said second support frame position.

7. The harmonica positioning device according to claim 6, wherein when said movement of said support frame is paused at said third position, and wherein when said switch is thereafter toggled once again, said movement between said first support frame position and said second support frame position resumes.

8. The harmonica positioning device according to claim 6, wherein when said movement of said harmonica support frame is paused at said third position, and wherein when said switch is thereafter toggled twice within a threshold amount of time, said movement between said first position and said second position is reversed.

9. The harmonica positioning device according to claim 5, wherein said switch comprises: a wireless foot pedal.

10. The harmonica positioning device according to claim 1, wherein said motor is a DC motor configured to be powered by rechargeable batteries.

11. The harmonica positioning device according to claim 1,
    further comprising: a USB port; and
    wherein said USB port is configured to receive a connector of a USB cable to power said harmonica positioning device.

12. A harmonica positioning device comprising:
    a yoke member, said yoke member having a first end, a second end, and a center portion between said first end and said second end, being configured to be worn around and be supported by a portion of a neck of a user;
    a support frame, said support frame having a first arm, a second arm, and a center section, a portion of said first arm being pivotally mounted to said yoke member;
    means for releasably mounting the harmonica to said support frame;
    a plurality of gears, each gear of said plurality of gears being rotatably mounted relative to said yoke member, and each being configured to rotatably engage an adjacent gear of said plurality of gears;

a shaft, said shaft being fixedly secured to a first gear of said plurality of gears to co-rotate with said first gear;

wherein a portion of said second arm is secured to said shaft;

a motor, said motor configured to drive said plurality of gears to rotate said shaft a first angular amount in a first direction, and to alternatively drive said plurality of gears to counter-rotate said shaft said angular amount in a second direction;

wherein when said shaft is driven to rotate said first angular amount, said support frame correspondingly rotates said angular amount to move from a first support frame position to a second support frame position; and wherein when said shaft is driven to counter-rotate said angular amount, said support frame correspondingly counter-rotates said angular amount to move from said second support frame position to said first support frame position.

* * * * *